US008031692B2

(12) United States Patent
Jeong et al.

(10) Patent No.: US 8,031,692 B2
(45) Date of Patent: Oct. 4, 2011

(54) METHOD FOR MAINTAINING UPLINK TIMING SYNCHRONIZATION IN A MOBILE COMMUNICATION SYSTEM AND USER EQUIPMENT APPARATUS FOR THE SAME

(75) Inventors: Kyeong-In Jeong, Hwaseong-si (KR); Ju-Ho Lee, Suwon-si (KR); Yong-Jun Kwak, Yongin-si (KR); Sung-Ho Choi, Suwon-si (KR); O-Sok Song, Suwon-si (KR); Gert Jan Van Lieshout, Middlesex (GB); Himke Van Der Velde, Middlesex (GB)

(73) Assignee: Samsung Electronics Co., Ltd (KR)

( * ) Notice: Subject to any disclaimer, the term of this patent is extended or adjusted under 35 U.S.C. 154(b) by 901 days.

(21) Appl. No.: 11/766,498

(22) Filed: Jun. 21, 2007

(65) Prior Publication Data
US 2008/0002660 A1 Jan. 3, 2008

(30) Foreign Application Priority Data
Jun. 22, 2006 (KR) .................... 10-2006-0056417

(51) Int. Cl.
*H04J 3/06* (2006.01)
*H04B 7/216* (2006.01)
(52) U.S. Cl. ...................... 370/350; 370/342
(58) Field of Classification Search .............. 370/516, 370/350, 389, 329; 375/371
See application file for complete search history.

(56) References Cited

U.S. PATENT DOCUMENTS

| 5,550,992 | A | 8/1996 | Hashimoto |
| 5,802,044 | A | 9/1998 | Baum et al. |
| 6,614,864 | B1 * | 9/2003 | Raphaeli et al. ............. 375/371 |
| 6,657,988 | B2 * | 12/2003 | Toskala et al. ............... 370/350 |
| 6,967,936 | B1 * | 11/2005 | Laroia et al. ................ 370/329 |
| 2004/0190638 | A1 | 9/2004 | Blasco Claret et al. |
| 2006/0063556 | A1 | 3/2006 | Palenius et al. |

FOREIGN PATENT DOCUMENTS

| EP | 1 124 347 | 8/2001 |
| KR | 1020020013344 | 2/2002 |
| KR | 1020020069317 | 8/2002 |
| WO | WO 02/073870 | 9/2002 |

OTHER PUBLICATIONS

Samsung: "UL Timing Sync Procedure", Internet Citation (Online), Mar. 27, 2006.

* cited by examiner

*Primary Examiner* — Lester Kincaid
*Assistant Examiner* — Kuo Woo
(74) *Attorney, Agent, or Firm* — The Farrell Law Firm, P.C.

(57) ABSTRACT

Disclosed is a method for maintaining uplink timing synchronization by a User Equipment (UE) in a mobile communication system, without uplink transmission of a preamble from a UE or without transmission of uplink timing difference information from an Evolved Node B (E-NB) to solve the inefficient use problem of radio resources, occurring due to periodic transmission of uplink signaling and downlink signaling during maintenance of the uplink timing synchronization, and a UE apparatus for the same.

10 Claims, 7 Drawing Sheets

METHOD FOR MAINTAINING UPLINK TIMING SYNCHRONIZATION IN A MOBILE COMMUNICATION SYSTEM AND USER EQUIPMENT APPARATUS FOR THE SAME

PRIORITY

This application claims priority under 35 U.S.C. §119(a) to a Korean Patent Application filed in the Korean Intellectual Property Office on Jun. 22, 2006 and assigned Serial No. 2006-56417, the contents of which are incorporated herein by reference.

BACKGROUND OF THE INVENTION

1. Field of the Invention

The present invention relates to a method for maintaining uplink timing synchronization (sync) in an Orthogonal Frequency Division Multiplexing (OFDM) system and a User Equipment (UE) apparatus for the same.

2. Description of the Related Art

The mobile communication scheme can be classified into Time Division Multiplexing (TDM), Code Division Multiplexing (CDM) and Orthogonal Frequency Multiplexing (OFM) schemes according to a multiplexing method. The CDM scheme is most popularly used in the current mobile communication system, and can be subdivided into a synchronous and an asynchronous CDM scheme. Since the CDM scheme basically uses codes, it tends to suffer from a lack of resources due to a limit of orthogonal code resources. Accordingly, an OFDM scheme has emerged as an alternative to the CDM scheme.

The OFDM scheme is for transmitting data using multiple carriers, and is a type of Multi-Carrier Modulation (MCM) scheme that converts a serial input symbol stream into parallel streams, and modulates each of the parallel streams with a plurality of orthogonal sub-carriers, i.e. sub-carrier channels, before transmission. The OFDM scheme is similar to the conventional Frequency Division Multiplexing (FDM) scheme, but it maintains orthogonality between multiple sub-carriers during transmission and overlaps frequency spectra. Therefore, the OFDM scheme has high frequency efficiency, is robust against frequency selective fading and multi-path fading, and can reduce Inter-Symbol Interference (ISI) with use of a guard interval. In addition, the OFDM scheme enables simple design of a hardware equalizer and is robust against impulse noises, so it can obtain the optimal transmission efficiency during high-speed data transmission.

A Long Term Evolution (LTE) system employing the OFDM scheme is now under discussion in $3^{rd}$ Generation Partnership Project (3GPP) as the next generation mobile communication system that will replace Universal Mobile Telecommunication System (UMTS), which is the $3^{rd}$ generation mobile communication standard.

Figure 1A:
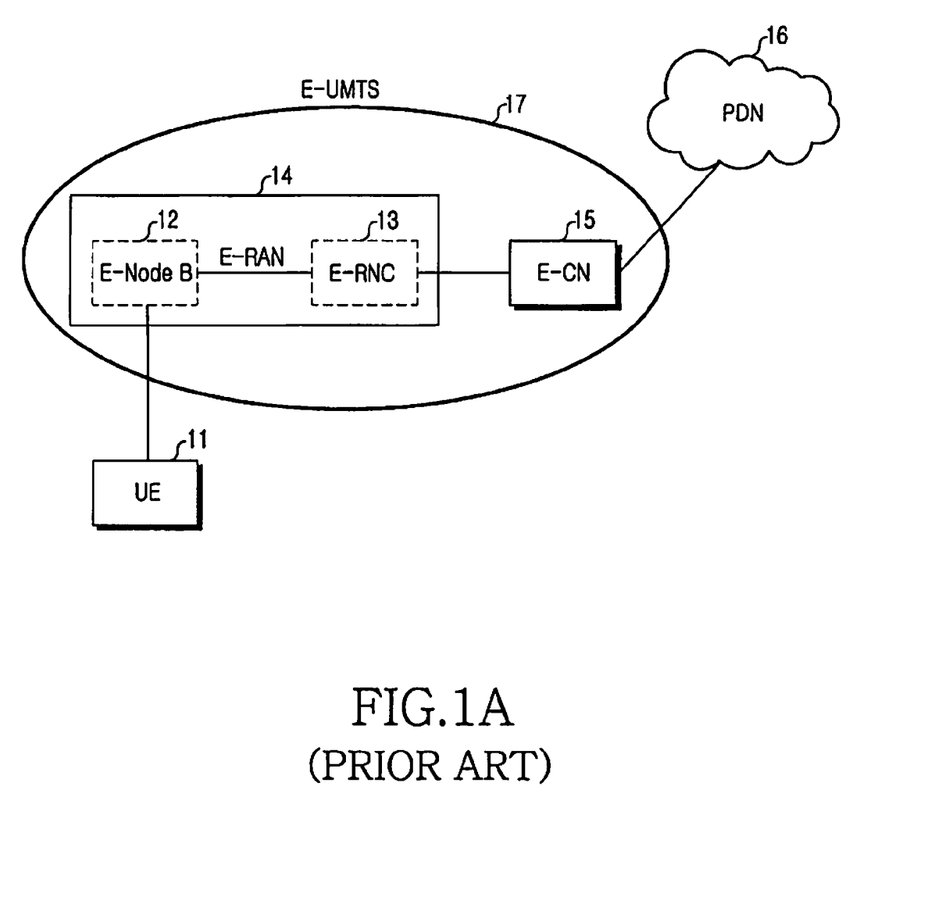
FIGS. 1A and 1B illustrate conventional configurations of an OFDM mobile communication system to which reference will be made by the present invention.
Figure 1B:
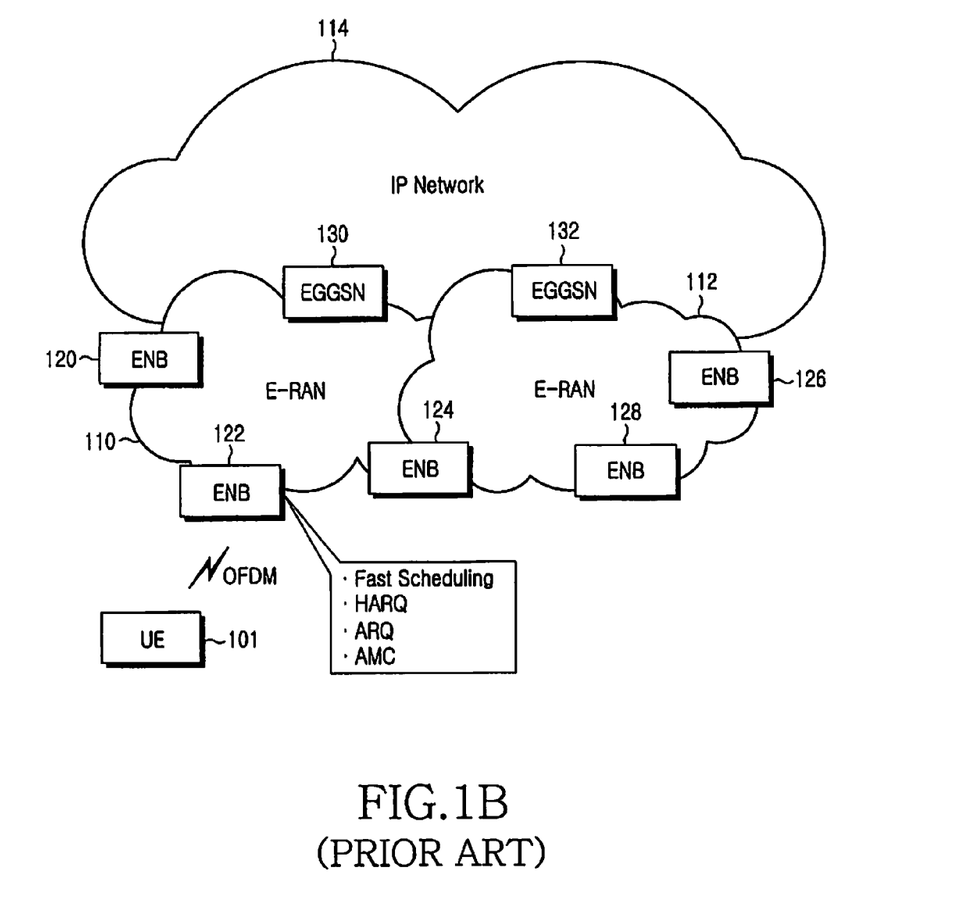

FIGS. 1A and 1B illustrate examples of a wireless mobile communication system to which reference will be made by the present invention, particularly illustrating examples of a 3GPP LTE system.

Referring to FIG. 1A, a UE 11 indicates a terminal for the 3GPP LTE system, and an Evolved Radio Access Network (E-RAN) 14, a radio base station device directly participating in communication with a terminal in the existing 3GPP system serves as a Node B for managing cells, and also serves as a Radio Network Controller (RNC) that controls a plurality of Node Bs and radio resources. In the E-RAN 14, an Evolved Node B (E-NB) 12 and an Evolved RNC (E-RNC) 13 can be separately implemented in the physically different nodes, or can be merged in a single node, in the manner of the existing 3GPP system. Although in the following description the E-NB 12 and the E-RNC 13 are physically merged in a single node of the E-RAN 14, the same can be applied to when the E-RNC 13 is separately implemented in the physically different node.

An Evolved Core Network (E-CN) 15 is a node provided by merging functions of a Serving GPRS Support Node (SGSN) and a Gateway GPRS Support Node (GGSN) in the existing 3GPP system into one function. The E-CN 15, interposed between a Packet Data Network (PDN) 16 and the E-RAN 14, serves as a gateway for allocating an Internet Protocol (IP) address to the UE 11 and connecting the UE 11 to the PDN 16. Definitions and functions of the SGSN and the GGSN follow the 3GPP standard, and a detailed description thereof will be omitted herein.

Referring to FIG. 1B, an Evolved UMTS Radio Access Network (E-RAN) 110 is simplified to a 2-node configuration of Evolved Node Bs (E-NBs) 120, 122, 124, 126 and 128, and anchor nodes 130 and 132. A UE 101, or a terminal, accesses an IP network by the E-RAN 110. The E-NBs 120 to 128 correspond to the existing Node Bs in the UMTS system, and are connected to the UE 101 over a wireless channel. Unlike the existing Node Bs, the E-NBs 120 to 128 perform more complex functions. In LTE, because all user traffics, including real-time services such as Voice over IP (VoIP), are serviced over a shared channel, there is a need for devices for gathering status information of UEs and performing scheduling depending thereon, and the E-NBs 120 to 128 manage the devices.

Generally, one E-NB controls a plurality of cells. In addition, the E-NB performs Adaptive Modulation & Coding (AMC) that determines a modulation scheme and a channel coding rate according to channel status of a UE. Similar to High Speed Downlink Packet Access (HSDPA), High Speed Uplink Packet Access (HSUPA) and Enhanced Dedicated CHannel (E-DCH) of UMTS, even in LTE, Hybrid Automatic Repeat reQuest (HARQ) is performed between the E-NB 120 to 128 and the UE 101. However, because LTE cannot meet various Quality of Service (QoS) requirements only with HARQ, Outer-ARQ in an upper layer can be performed between the UE 101 and the E-NBs 120 to 128. HARQ, as is well known, refers to a technique for soft-combining previously received data with retransmitted data without discarding the previously received data, thereby increasing a reception success rate. In high-speed packet communication, such as HSDPA and EDCH, the HARQ technique is used to increase transmission efficiency. It is expected that to realize a data rate of a maximum of 100 Mbps, LTE will use OFDM as a wireless access technology in a 20-MHz bandwidth.

Figure 2:
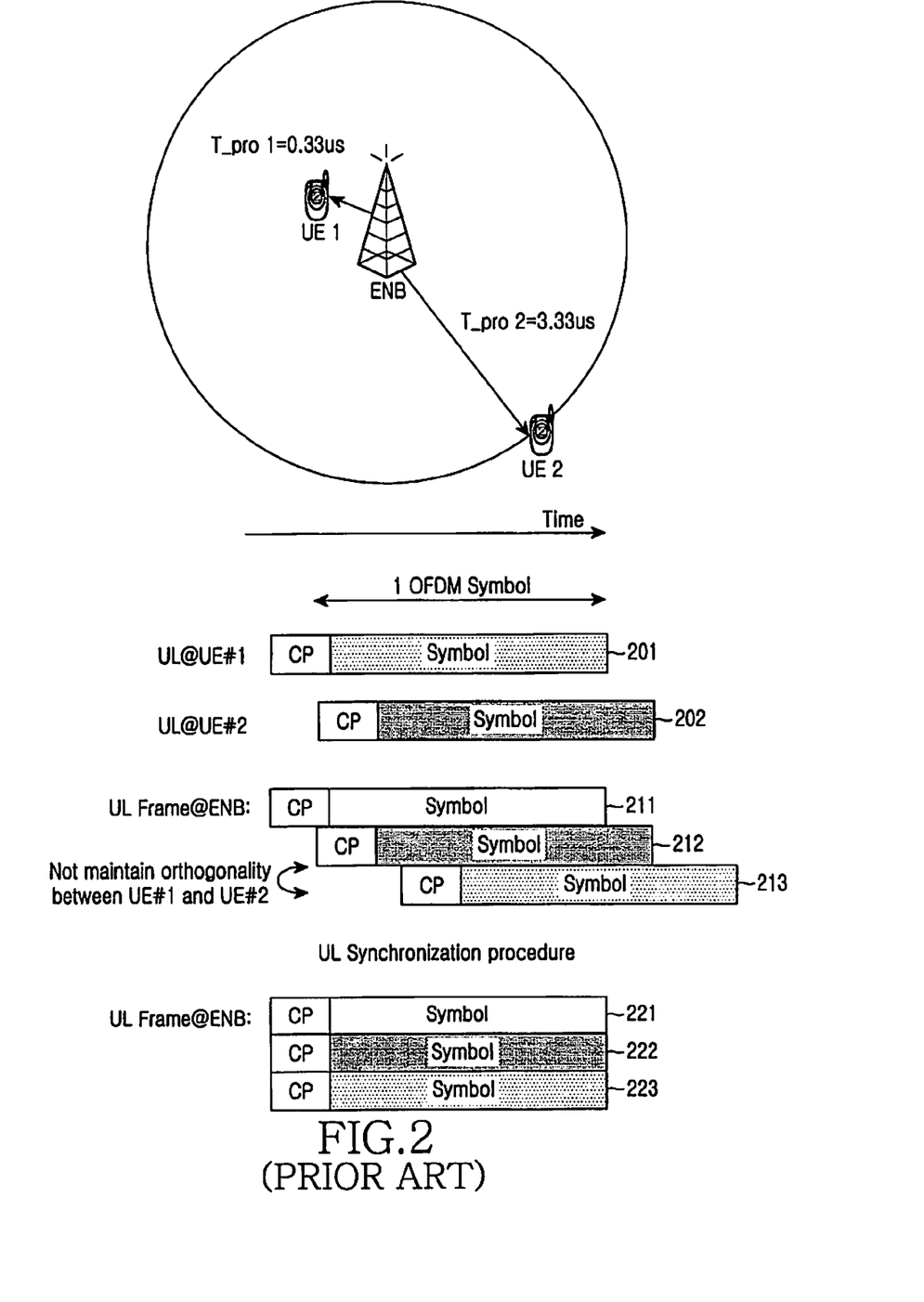
FIG. 2 illustrates an uplink timing synchronization procedure in an OFDM mobile communication system.

FIG. 2 illustrates an uplink timing synchronization procedure in a 3GPP LTE system to which OFDM is applied.

Referring to FIG. 2, a first UE (UE1) is located near an E-NB, and a second UE (UE2) is located far from the E-NB. T_pro1 indicates a propagation delay time in wireless transmission up to the UE1, and T_pro2 indicates a propagation delay time in wireless transmission up to the UE2. Because the UE1 is located nearer to the E-NB compared to the UE2, it has less propagation delay time. In FIG. 2, T_pro1 is 0.33 us, and T_pro2 is 3.33 us.

In one cell (indicated by a circle in FIG. 2) of the E-NB, when the UE1 and the UE2 are powered on or are in an idle mode, uplink timing synchronization of the UE1, the UE2 and of UEs in the cell, detected by the E-NB, are not matched to each other. Reference numeral 201 indicates timing synchronization for uplink transmission of an OFDM symbol of the UE1, and reference numeral 202 indicates timing synchronization for uplink transmission of an OFDM symbol of the UE2. When propagation delay times of uplink transmission of the UE1 and the UE2 are considered, timings at the E-NB receiving the uplink OFDM symbols are shown by reference numerals 211, 212 and 213. That is, the uplink symbol 201 of the UE1 is received at the E-NB with a propagation delay time in the timing 212, and the uplink symbol 202 of the UE2 is received at the E-NB with a propagation delay time in the timing 213.

Since uplink timing synchronizations for the UE1 and the UE2 have not been acquired (matched) yet for the timings 212 and 213, start timing 211 in which the E-NB receives and decodes an uplink OFDM symbol, timing 212 in which the E-NB receives an OFDM symbol from the UE1, and timing 213 in which the E-NB receives an OFDM symbol from the UE2 are different from each other. Therefore, the uplink symbols transmitted from the UE1 and the UE2 serve as interference components to each other, as they have no orthogonality, and the E-NB may not successfully decode the uplink symbols 201 and 202 transmitted from the UE1 and the UE2, due to the interference and the discrepancy between the start timing 211 and the reception timings 212 and 213 of uplink symbols.

Therefore, the E-NB matches uplink symbol reception timings of the UE1 and the UE2 through the uplink timing synchronization procedure. After completion of the uplink timing synchronization procedure, the E-NB can match the start timing 221 in which it receives and decodes uplink OFDM symbols, the timing 222 in which it receives an uplink OFDM symbol from the UE1, and the timing 223 in which it receives an uplink OFDM symbol from the UE2. After matching the timings, the E-NB can maintain orthogonality between the uplink symbols transmitted from the UE1 and the UE2, and thus can successfully decode the uplink symbols 201 and 202 transmitted from the UE1 and the UE2.

Figure 3:
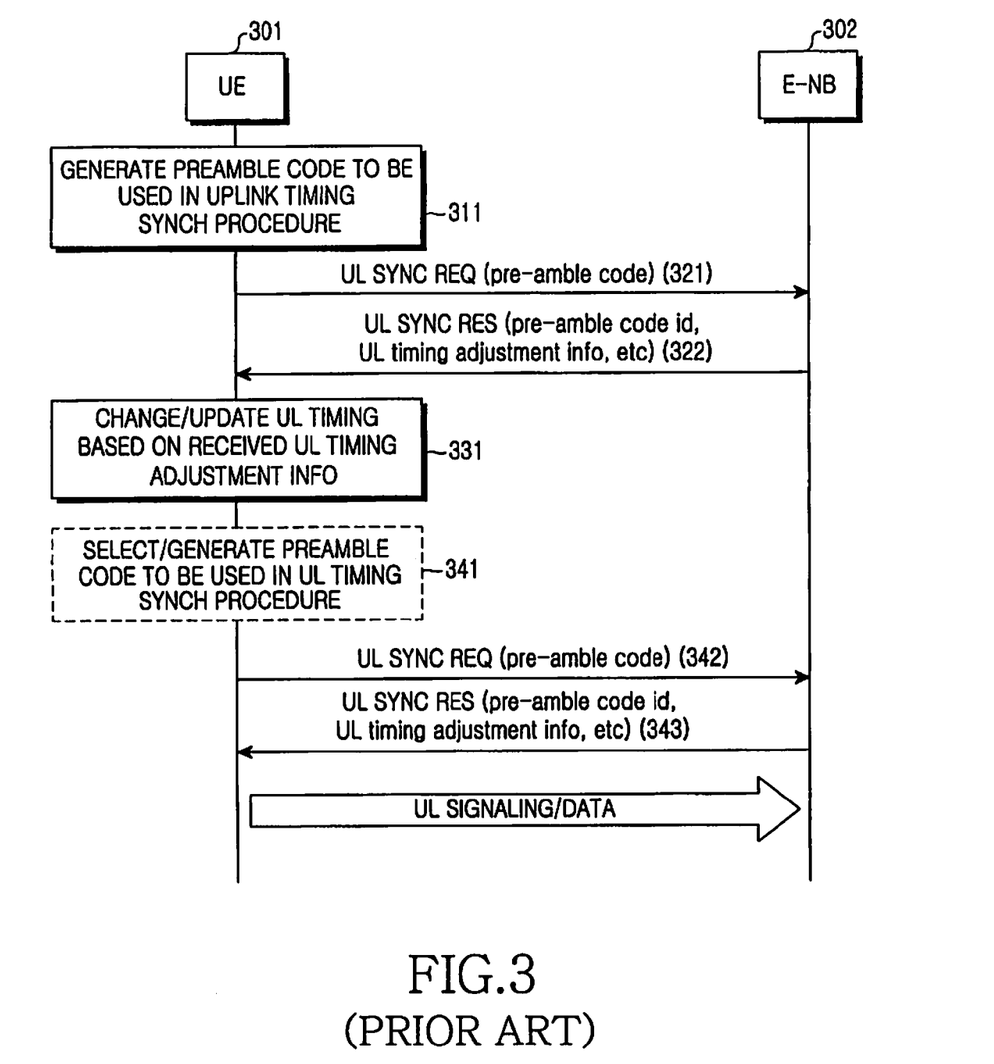
FIG. 3 illustrates an example of an uplink timing synchronization procedure.

FIG. 3 illustrates an example of an uplink timing synchronization procedure.

In step 311, a UE 301 generates a preamble code to be used in the uplink timing synchronization procedure. If the UE 301 is constructed such that multiple preamble codes can be used in the uplink timing synchronization procedure, the UE 301 generates one of the multiple preamble codes. The 'preamble code' is a type of code sequence agreed upon between the UE 301 and an E-NB 302, and the UE 301 transmits the preamble code over the uplink using radio resources allocated by the E-NB 302 in step 321 (UL SYNC REQ). Upon receipt of the preamble code, the E-NB 302 calculates a correlation between the preamble code and candidate preamble codes available for uplink timing synchronization during a sliding window having a certain constant interval, to find the timing and preamble code indicating the highest correlation. In addition, the E-NB 302 calculates a difference between the then-reception timing and the timing in which it should actually have received the preamble code, and provides in step 322 the UE 301 with an IDentifier (ID) of the found preamble code and information on the uplink timing difference using a response message (UL SYNC RES). In step 331, the UE 301 changes and updates the uplink transmission timing using the information on the uplink timing difference, received through the response message. From this time one, uplink signaling and data transmission is achieved using the changed and updated uplink timing.

Steps 341, 342 and 343 indicate a process of re-performing the uplink timing synchronization procedure in steps 311, 321 and 322 to recheck the changed and updated timing, and can be omitted.

The uplink timing synchronization procedure shown in FIG. 3 should be periodically performed because the UE in the mobile communication system continuously moves, and thus the distance difference between the UE and the E-NB may change over time. When the periodic uplink timing synchronization procedure is performed, the UE periodically generates a preamble code used for the uplink timing synchronization procedure and transmits the preamble code to the E-NB over the uplink, and the E-NB should find an uplink timing difference by receiving and decrypting the periodic uplink preamble code, and provide the uplink timing difference information to the UE over the downlink. Therefore, overhead of the uplink signaling/downlink signaling occurs, causing inefficient use of radio resources.

SUMMARY OF THE INVENTION

An aspect of the present invention is to address at least the problems and/or disadvantages and to provide at least the advantages described below. Accordingly, an aspect of the present invention is to provide a method of maintaining uplink timing synchronization without uplink transmission of a preamble from a UE or without transmission of uplink timing difference information from an E-NB to solve the inefficient use problem of radio resources, occurring due to periodic transmission of uplink signaling and downlink signaling during maintenance of the uplink timing synchronization, and a UE apparatus for the same.

According to the present invention, there is provided a method for maintaining uplink timing sync in a mobile communication system. The method includes transmitting to a Node B an uplink sync request message including a preamble code, receiving from the Node B an uplink sync response message in response to the request message, adjusting uplink timing according to uplink timing adjustment information included in the response message, and storing the adjusted uplink timing as reference uplink timing for uplink signaling or data transmission; after storing the reference uplink timing, periodically measuring downlink timing, and calculating a difference between the measured downlink timing and previously stored reference downlink timing, determining the uplink timing using the calculated difference of the downlink timing and the reference uplink timing, receiving a request message for readjustment of the uplink timing from a Node B that has detected discrepancy of the uplink timing, readjusting the uplink timing using uplink timing adjustment information included in the uplink timing readjustment request message, updating the reference uplink timing with the readjusted uplink timing, and storing the updated reference uplink timing, and when updating the reference uplink timing, updating the last measured downlink timing as the reference downlink timing, and storing the reference downlink timing.

According to the present invention, there is provided a user equipment apparatus for maintaining uplink timing sync. The user equipment apparatus includes a message transceiver for receiving a message including uplink timing adjustment information from a Node B, and transmitting uplink data and signaling to the Node B according to uplink timing, a message decrypter for decrypting a message received from the message transceiver to acquire the uplink timing adjustment information, a reference timing manager for setting reference uplink timing according to the acquired uplink timing adjustment information, and setting the reference downlink timing according to the downlink timing, an uplink timing adjuster for periodically adjusting the uplink timing using a difference between the downlink timing and the reference downlink timing, and the reference uplink timing, a timer for counting a period for which the uplink timing is adjusted, and a downlink measurer for measuring the downlink timing according to the period, and providing the measured downlink timing to the uplink timing adjuster and the reference timing manager.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF PREFERRED EMBODIMENTS

Preferred embodiments of the present invention will now be described in detail with reference to the annexed drawings. In the following description, a detailed description of known functions and configurations incorporated herein has been omitted for the sake of clarity and conciseness.

In the present invention, when a UE acquires UpLink (UL) timing synchronization with an E-NB through an initial UL timing synchronization procedure, the UE sets DownLink (DL) timing during corresponding UL transmission before DL transmission including UL timing difference information from the E-NB, or DL timing during DL transmission including the UL timing difference information, as Reference DL timing, and sets and maintains the then-UL timing adjusted using the UL timing difference information as Reference UL timing. The UE periodically acquires DL timing through measurement on a DL channel, finds a DL timing difference by comparing it with the Reference DL timing, and finds the then-UL timing by applying the DL timing difference to the Reference UL timing. The period can be short, and can be configured by the E-NB.

When the UL timing has discrepancies due to abrupt unstableness of the DL channel, the discrepancy is detected by the E-NB and UL timing difference information can be signaled to the UE over the DL. Upon receipt of the UL timing difference information transmitted over the DL, the UE changes/updates Reference UL timing to the UL timing adjusted using the UL timing difference information, and changes/updates Reference DL timing to DL timing during corresponding UL transmission before DL transmission including the UL timing difference information, or to DL timing during DL transmission including the UL timing difference information.

To prevent the discrepancy of UL timing due to abrupt unstableness of the DL channel, the UE finds a difference between an average value of DL timing, calculated through measurement for the period, and the Reference DL timing, or finds a difference between the DL timing and the Reference DL timing through periodic measurement on the DL channel. When the difference between the average value of DL timing, calculated through measurement on the DL channel for the period, and the Reference DL timing has an abnormally large value, it can be disregarded.

The term 'UL timing' used throughout the specification, which is the timing in which the UE transmits signaling/data over the UL, can be indicated as a timing offset (in units of actual time such as μs, or in such units as slots, symbols, subframes or frames) with respect to a DL frame to which the UE has matched a DL sync channel, and the 'DL timing' indicates DL frame timing acquired through a DL sync channel.

Figure 4:
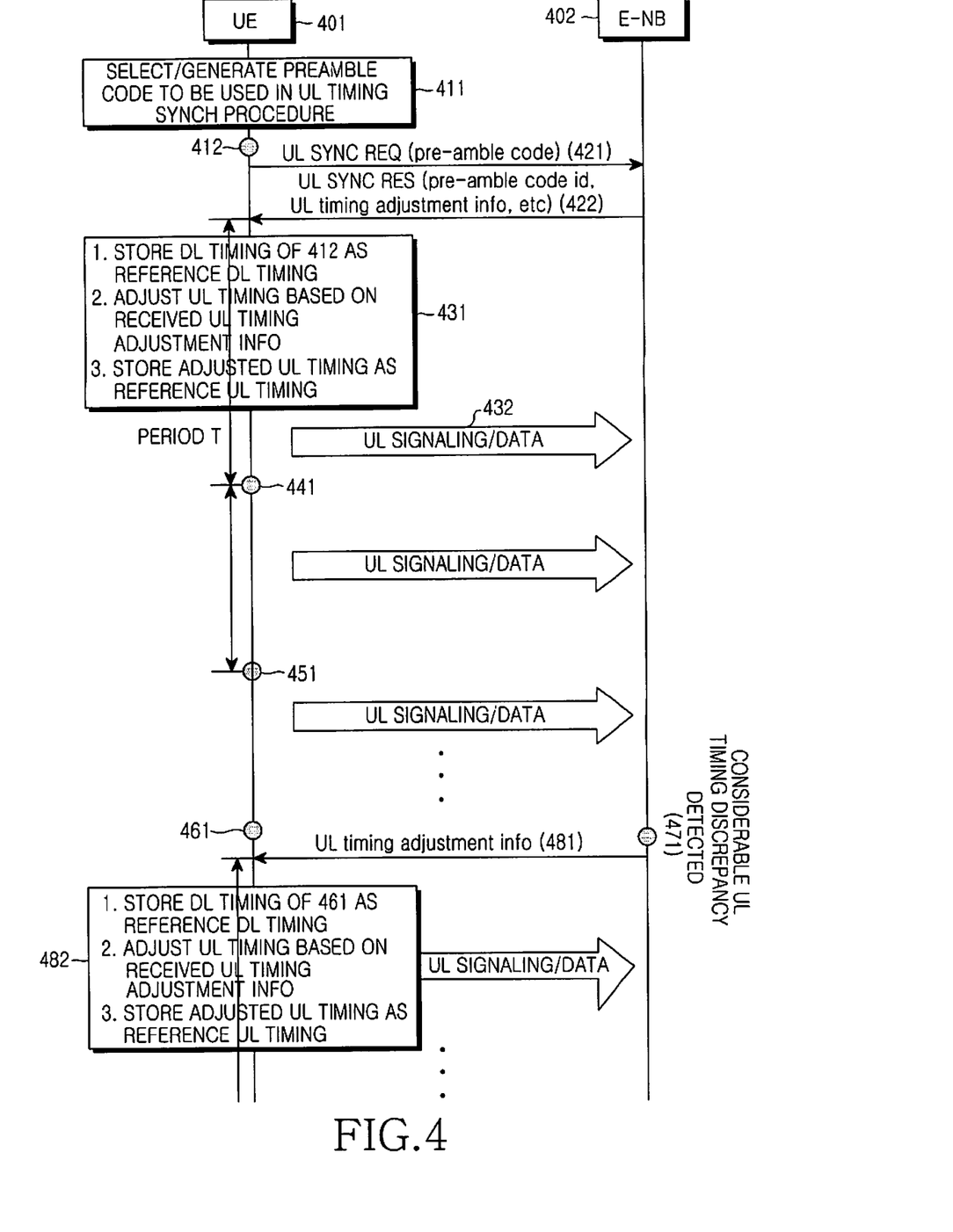
FIG. 4 illustrates a method of maintaining UL timing synchronization in an OFDM system according to the present invention.

FIG. 4 illustrates generally a method of finding UL timing according to the present invention, and more particularly a method of finding UL timing by applying a difference between DL timing and Reference DL timing to Reference UL timing.

Referring to FIG. 4, steps 411, 421 and 422 indicate execution of an initial UL timing synchronization procedure. That is, in step 411, a UE 401 generates a preamble code to be used for a UL timing synchronization procedure. If the UE 401 is constructed such that multiple preamble codes can be used in the UL timing synchronization procedure, the UE 401 generates one of the multiple preamble codes. The 'preamble code' is a type of code sequence agreed upon between the UE 401 and an E-NB 402, and the UE 401 transmits the preamble code over the uplink using radio resources allocated by the E-NB 402 in step 421 (UL SYNC REQ). Upon receipt of the preamble code, the E-NB 402 calculates a correlation between the received preamble code and candidate preamble codes available for UL timing synchronization during a sliding window having a constant interval, to find the timing and preamble code indicating the highest correlation. In addition, the E-NB 402 calculates a difference between the then-reception timing and the timing in which it should actually have received the preamble code, and provides in step 422 the UE 401 with an ID of the preamble code and information on the UL timing difference using a response message (UL SYNC RES).

In step 431, the UE 401 adjusts UL timing using the UL timing difference information received through the response message, and sets it as Reference UL timing. In addition, the UE 401 sets DL timing in step 412 as Reference DL timing.

Here, an operation order of step 431 is subject to change. That is, if steps 411, 421 and 422 are re-performed in the manner of steps 341, 342 and 343 of FIG. 3 to recheck UL timing adjusted according to the UL timing difference information received in step 422, Reference DL timing is reset to the DL timing during the re-performed UL preamble code transmission, and Reference UL timing is reset to the UL timing adjusted according to the newly received UL timing difference information.

After completion of the UL timing adjustment in step 431, the UE 401 performs in step 432 UL signaling/data transmission with the adjusted UL timing.

In FIG. 4, for the DL timing measurement of step 412 for Reference DL timing setting, although when the UL timing difference information was received over the DL in step 422, DL timing for the DL at the time (step 421) that the UL transmission has occurred before the DL reception is measured herein by way of example, the present invention does not exclude any other possible time for which the DL timing for setting Reference DL timing is measured. For example, DL timing for the DL at the time (step 422) that UL timing difference information was received over the DL, can be set as Reference DL timing.

In steps 441 and 451, the UE 401 measures DL timing at each time through measurement for a period T, calculates a difference between the measured DL timing and the Reference DL timing, and calculates/adjusts the UL timing by applying the DL timing difference to the Reference UL timing. That is, without signaling exchange with the E-NB 402, the UE 401 finds DL timing through periodic measurement, finds a timing difference between the DL timing and Reference DL timing by comparing the DL timing with Reference DL timing, and then finds UL timing by applying the timing difference to the Reference UL timing.

When UL timing is discrepant due to abrupt unstableness of the DL channel, the E-NB 402 detects the discrepancy in step 471, and transmits UL timing difference information to the UE 401 using a message in step 481, thereby sending a request for readjustment of the UL timing to the UE 401. Upon receipt of a UL timing readjustment instruction, the UE 401 resets the DL timing for the corresponding UL transmission time (step 461 in FIG. 4) as Reference DL timing, and resets the UL timing adjusted using the UL timing difference information received through a message in step 481, as Reference UL timing.

Although not shown in FIG. 4, a difference between an average value of DL timing measured for the period T and the Reference DL timing can be applied to the Reference UL timing in steps 441 and 451. In addition, when the average value of DL timing measured for the period T is used for finding a difference from the Reference DL timing as described above, the abnormally great difference can be disregarded without application. Even when the DL timing measured in steps 411 and 451 of FIG. 4, other than the average value of DL timing measured for the period T, is used for finding the difference with the Reference DL timing, the abnormally great difference can be disregarded without application. In this case, the previously acquired UL timing can be used as it is.

Figure 5:
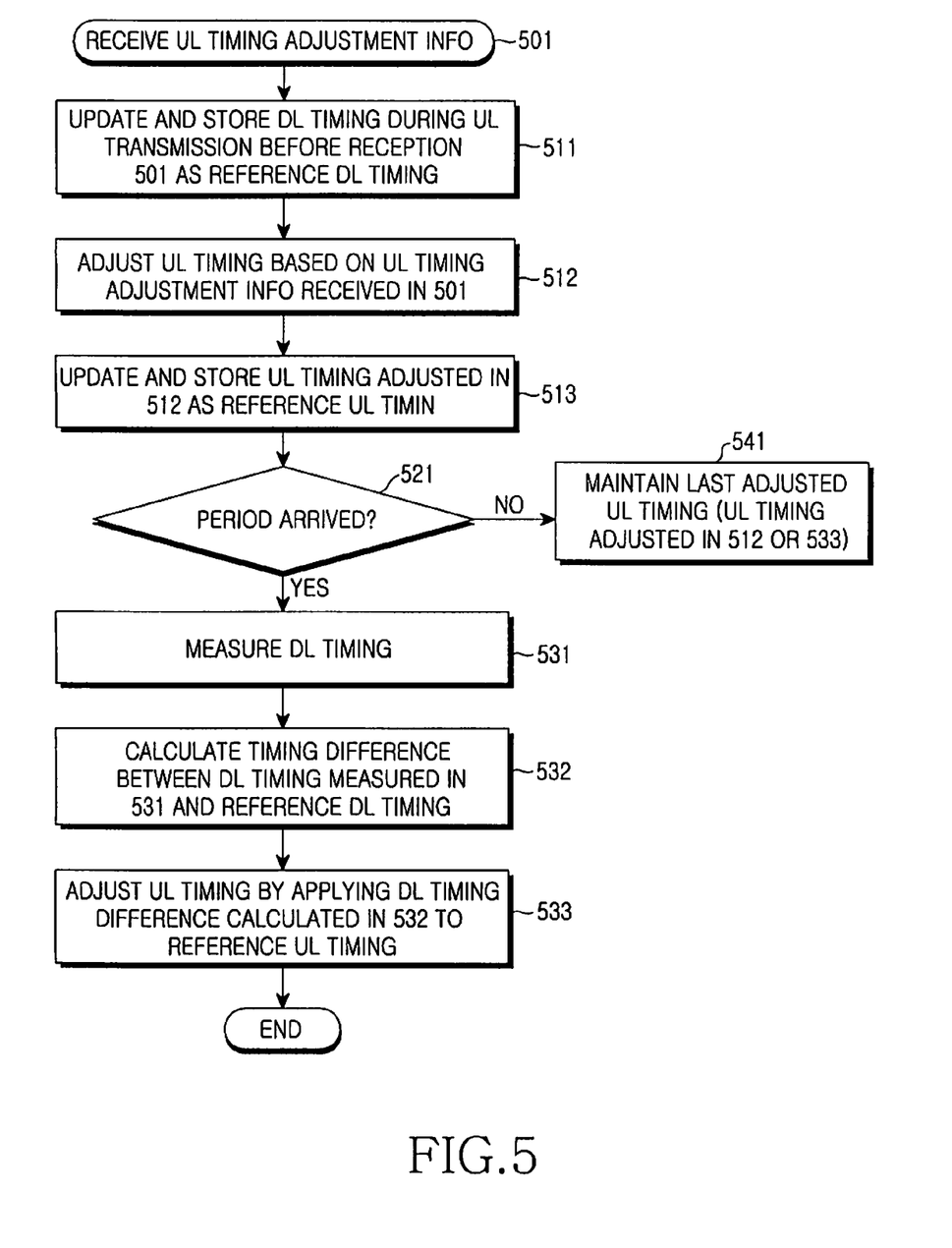
FIG. 5 illustrates an operation of a UE according to the present invention.

FIG. 5 illustrates an operation of a UE to which an embodiment of the present invention is applied.

Referring to FIG. 5, in step 501, the UE receives UL timing difference information (UL timing adjustment info or UL timing advance info) from an E-NB. In step 511, the UE sets or updates DL timing during UL transmission as Reference DL timing before reception of the UL timing difference information of step 501, and stores the DL timing. In step 512, the UE adjusts the UL timing using the UL timing difference information received in step 501. In step 513, the UE sets or updates the UL timing adjusted in step 512 as Reference UL timing, and stores the Reference UL timing. In step 521, the UE determines whether a period of adjusting UL timing has arrived.

If the UL timing adjustment period has arrived, the UE measures DL timing through measurement in step 531, calculates a difference between the measured DL timing and the Reference DL timing in step 532, and then adjusts UL timing by applying the calculated difference to the Reference UL timing in step 533. However, if the adjustment period of the UL timing has not arrived, the UE maintains the last adjusted UL timing in step 541.

Although not shown in FIG. 5, as described above, the UE does not exclude any other possible time for which it sets Reference DL timing in step 511. For example, the UE can set, as Reference DL timing, the DL timing for which it has received UL timing difference information over the DL.

Figure 6:
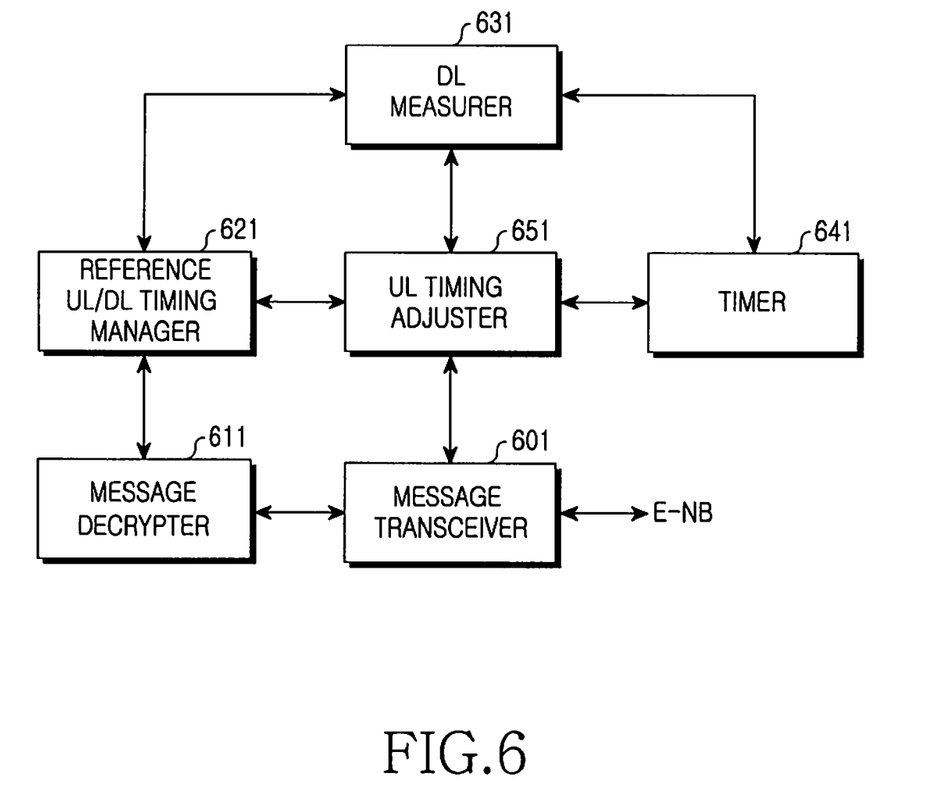
FIG. 6 illustrates a UE apparatus according to the present invention.

FIG. 6 illustrates a UE apparatus to which an embodiment of the present invention is applied.

Referring to FIG. 6, the UE includes a message transceiver 601, a message decrypter 611, a Reference UL/DL timing manager 621, a DL measurer 631, a timer 641 and a UL timing adjuster 651.

The message transceiver 601 receives signaling including UL timing difference information from an E-NB. The message decrypter 611 decrypts a message received from the message transceiver 601 to detect UL timing difference information, and the UL timing difference information is delivered to the UL timing adjuster 651 via the Reference UL/DL timing manager 621. The UL timing adjuster 651 adjusts UL timing using the UL timing difference information received via the Reference UL/DL timing manager 621, and updates the adjusted UL timing as Reference UL timing. The updated Reference UL timing is used for later setting the timing for UL message transmission via the message transceiver 601.

Upon receipt of the UL timing difference information via the message transceiver 601 and the message decrypter 611, the Reference UL/DL timing manager 621 updates the DL timing measured by the DL measurer 631 as Reference DL timing. The DL timing measured by the DL measurer 631 is DL timing when the UE transmitted the corresponding UL message before it receives a message including UL timing difference information. The timer 641 manages a UL timing update period for matching UL timing synchronization, at which period the timer 641 reports arrival of the period to the DL measurer 631 and the UL timing adjuster 651. The DL measurer 631 acquires the DL timing, and the UL timing adjuster 651 calculates a timing difference by comparing the acquired DL timing with the Reference DL timing stored in the Reference UL/DL timing manager 621, and adjusts UL timing by applying the timing difference to the Reference UL timing stored in the Reference UL/DL timing manager 621.

As is apparent from the foregoing description, according to the present invention, the UE stores UL timing and DL timing for the time at which it has acquired initial UL timing synchronization, as Reference UL timing and Reference DL timing, respectively, periodically finding DL timing, calculating a difference by comparing the DL timing with the Reference DL timing, and maintaining UL timing by applying the difference to the Reference UL timing. By doing so, the number of signaling transmissions between the UE and the E-NB is reduced, thereby reducing overhead of UL/DL signaling and enabling efficient use of radio resources.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for maintaining uplink timing synchronization (sync) in a mobile communication system, comprising:

transmitting from a User Equipment (UE) to a Node B an uplink sync request message including a preamble code;

receiving at the UE from the Node B an uplink sync response message in response to the request message;

adjusting, at the UE, uplink timing according to uplink timing adjustment information included in the response message, and storing the adjusted uplink timing as reference uplink timing for uplink signaling or data transmission at the UE;

periodically measuring downlink timing at the UE after storing the reference uplink timing, and calculating a difference between the measured downlink timing and previously stored reference downlink timing at the UE;

periodically re-determining the uplink timing at the UE by applying the calculated difference between the measured downlink timing and the previously stored reference downlink timing to the reference uplink timing after each periodically measured downlink timing;

receiving a request message for readjustment of the uplink timing at the UE from a Node B that has detected a discrepancy of the uplink timing;

readjusting the uplink timing at the UE using uplink timing adjustment information included in the uplink timing readjustment request message, updating the reference uplink timing with the readjusted uplink timing at the UE, and storing the updated reference uplink timing at the UE; and updating a last measured downlink timing as the reference downlink timing at the UE when updating the reference uplink timing, and storing the updated reference downlink timing at the UE.

2. The method of claim 1, wherein the uplink timing information indicates a timing difference between the preamble code and a candidate preamble code that has a highest correlation with the preamble code and is available for uplink timing sync during a specific interval.

3. The method of claim 1, wherein downlink timing for when the uplink timing is adjusted is set as the reference downlink timing, and then stored.

4. The method of claim 1, wherein downlink timing for when the uplink sync response message is received is set as the reference downlink timing, and then stored.

5. The method of claim 1, wherein the calculation of the difference further comprises calculating a difference between an average value of downlink timing measured for a specific time and the previously stored reference downlink timing.

6. A user equipment apparatus for maintaining uplink timing synchronization (sync), comprising:
   a message transceiver for receiving a message including uplink timing adjustment information from a Node B, and transmitting uplink data and signaling to the Node B according to uplink timing;
   a message decrypter for decrypting a message received from the message transceiver to acquire the uplink timing adjustment information;
   a reference timing manager for setting reference uplink timing according to the acquired uplink timing adjustment information, and setting the reference downlink timing according to the downlink timing;
   an uplink timing adjuster for calculating a difference between a periodically measured downlink timing and the reference downlink timing and periodically adjusting the uplink timing by applying the calculated difference to the reference uplink timing after each periodically measured downlink timing and difference calculation;
   a timer for counting a period for which the uplink timing is adjusted; and
   a downlink measurer for measuring the downlink timing according to the period, and providing the measured downlink timing to the uplink timing adjuster and the reference timing manager.

7. The user equipment apparatus of claim 6, wherein the message transceiver receives from the Node B a readjustment request message for requesting readjustment of the uplink timing;
   wherein the uplink timing adjuster readjusts the uplink timing using the uplink timing adjustment information included in the readjustment request message; and further
   wherein the reference timing manager updates and stores a last measured downlink timing as the reference downlink timing, and updates and stores the readjusted uplink timing as the reference uplink timing.

8. The user equipment apparatus of claim 6, wherein the reference timing manager sets, as the reference downlink timing, downlink timing for when the uplink timing adjuster adjusts the uplink timing, and stores the reference downlink timing.

9. The user equipment apparatus of claim 6, wherein the reference timing manager sets, as the reference downlink timing, downlink timing for when the message transceiver receives the message, and stores the reference downlink timing.

10. The user equipment apparatus of claim 6, wherein the reference timing manager calculates a difference between an average value of downlink timing measured for the period by the downlink measurer and previously stored reference downlink timing, and transmits the calculated timing difference information to the uplink timing adjuster so as to adjust the uplink timing.

* * * * *